US008302026B2

(12) United States Patent
Wang et al.

(10) Patent No.: US 8,302,026 B2
(45) Date of Patent: Oct. 30, 2012

(54) MULTI-PANEL USER INTERFACE

(75) Inventors: Min Wang, Beijing (CN); Jian Wang, Beijing (CN); Haidong Zhang, Beijing (CN); Chunhui Zhang, Beijing (CN); Xiangwei Zhu, Beijing (CN); Xiao Yang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 544 days.

(21) Appl. No.: 12/324,975

(22) Filed: Nov. 28, 2008

(65) Prior Publication Data

US 2010/0138767 A1   Jun. 3, 2010

(51) Int. Cl.
*G06F 3/048* (2006.01)

(52) U.S. Cl. ........ 715/788; 715/769; 715/778; 715/781; 715/792; 715/798; 715/800

(58) Field of Classification Search ........... 715/769, 715/778, 781, 788, 790, 792, 798, 800
See application file for complete search history.

(56) References Cited

U.S. PATENT DOCUMENTS

| | | | | |
|---|---|---|---|---|
| 5,227,771 A * | 7/1993 | Kerr et al. | ...... | 715/800 |
| 5,513,342 A | 4/1996 | Leong et al. | | |
| 5,712,995 A * | 1/1998 | Cohn | ...... | 715/792 |
| 5,745,717 A * | 4/1998 | Vayda et al. | ...... | 715/834 |
| 5,771,042 A * | 6/1998 | Santos-Gomez | ...... | 715/800 |
| 5,844,547 A | 12/1998 | Minakuchi et al. | | |
| 6,008,809 A * | 12/1999 | Brooks | ...... | 715/792 |
| 6,204,845 B1 * | 3/2001 | Bates et al. | ...... | 715/788 |
| 6,567,102 B2 | 5/2003 | Kung | | |
| 6,690,387 B2 | 2/2004 | Zimmerman et al. | | |
| 6,832,355 B1 * | 12/2004 | Duperrouzel et al. | ...... | 715/788 |
| 6,912,462 B2 | 6/2005 | Ogaki | | |
| 7,009,599 B2 | 3/2006 | Pihlaja | | |
| 7,075,512 B1 | 7/2006 | Fabre et al. | | |
| 7,080,326 B2 * | 7/2006 | Molander et al. | ...... | 715/788 |
| 7,102,626 B2 | 9/2006 | Denny, III | | |
| 7,178,109 B2 | 2/2007 | Hewson et al. | | |
| 7,417,644 B2 | 8/2008 | Cooper et al. | | |
| 7,469,381 B2 | 12/2008 | Ording | | |
| 7,546,547 B2 * | 6/2009 | Carey et al. | ...... | 715/788 |

(Continued)

FOREIGN PATENT DOCUMENTS

CA   2498541   8/2005

OTHER PUBLICATIONS

Amy K. Karlson et al., "AppLens and LaunchTile: Two Designs for One-Handed Thumb Use on Small Devices," Apr. 2-7, 2005, CHI 2005 | Papers: Small Devices 1, pp. 201-210.*

(Continued)

*Primary Examiner* — Weilun Lo
*Assistant Examiner* — Dino Kujundzic
(74) *Attorney, Agent, or Firm* — Lee & Hayes, PLLC

(57) ABSTRACT

A user interface and techniques for presenting content in a panel-based layout are described. The user interface has one or more demarcation bars to define multiple panels on a screen area. Different subject matter (e.g., data, content, programs, etc.) may be placed in the various panels. A bar navigation element facilitates navigation of the bar(s) among preset positions. With the bar navigation element, a user can intuitively resize the panels using just a single actuation (e.g., a single click of a mouse, or a stylus tap). The panels remain in their original orientation and relative positioning, and remain visible in the user interface so that the user can track their location.

20 Claims, 11 Drawing Sheets

U.S. PATENT DOCUMENTS

| | | | |
|---|---|---|---|
| 7,904,832 B2* | 3/2011 | Ubillos | 715/800 |
| 2002/0191028 A1* | 12/2002 | Senechalle et al. | 345/800 |
| 2005/0193340 A1 | 9/2005 | Amburgey et al. | |
| 2005/0193361 A1 | 9/2005 | Vitanov et al. | |
| 2005/0235206 A1 | 10/2005 | Arend et al. | |
| 2006/0132460 A1 | 6/2006 | Kolmykov-Zotov et al. | |
| 2006/0247855 A1 | 11/2006 | de Silva et al. | |
| 2007/0024646 A1 | 2/2007 | Saarinen et al. | |
| 2007/0094698 A1* | 4/2007 | Bountour et al. | 725/132 |
| 2007/0250788 A1* | 10/2007 | Rigolet | 715/788 |
| 2008/0016458 A1 | 1/2008 | Good et al. | |
| 2008/0168401 A1 | 7/2008 | Boule et al. | |
| 2008/0320419 A1 | 12/2008 | Matas et al. | |
| 2009/0119615 A1 | 5/2009 | Huang | |

OTHER PUBLICATIONS

Sizer v3.3, "Programs by Brian Apps—Sizer," retrieved from http://www.brianapps.net/sizer.html, as published on Nov. 6, 2007.*

"A Truly Touching Experience", retrieved on Dec. 29, 2008 at <<http://www.lge.com/products/model/detail/kf700.jhtml, LG Global Site.

Brandl, et al., "An Adaptable Rear-Projection Screen Using Digital Pens and Hand Gestures", retrieved on Dec. 29, 2008 at <<http://staff.fh-hagenberg.at//haller/publications/2007/An%20Adaptable%20Rear-Projection%20Screen%20Using%20Digital%20Pens%20And%20Hand%20Gestures.pdf>>, pp. 1-6.

Dachselt, et al., "FacetZoom: A Continuous Multi-Scale Widget for Navigating Hierarchical Metadata", retrieved on Dec. 29, 2008 at <<http://delivery.acm.org/10.1145/1360000/1357265/p1353-dachselt.pdf?key1=1357265&key2=8360260321&coll=GUIDE&dl=GUIDE&CFID=16613364&CFTOKEN=38072166>>, CHI 2008 Proceedings, Apr. 5-10, 2008, Florence, Italy, pp. 1353-1356.

Kandogan, et al., "Elastic Windows: Evaluation of Multi-Window Operations", retrieved on Sep. 30, 2008 at <<http://www.sigchi.org/chi97/proceedings/paper/ek.htm>>, ACM (CHI 97), Mar. 26, 1997, pp. 1-15.

Kandogan, et al., "Elastic Windows: Evaluation of Multi-Window Operations", retrieved on Dec. 29, 2008 at <<http://delivery.acm.org/10.1145/260000/258720/p250-kandogan.pdf?key1=258720&key2=0270260321&coll=GUIDE&dl=GUIDE&CFID=16088628&CFTOKEN=41005193>>, CHI 97, Mar. 22-27, 1997, Atlanta GA, USA, 8 pages.

Karson, et al., "AppLens and LaunchTile: Two Designs for One-Handed Thumb Use on Small Devices", retrieved on Dec. 29, 2008 at <<http://delivery.acm.org/10.1145/1060000/1055001/p201-karison.pdf?key1=1055001&key2=9870260321&coll=GUIDE&dl=GUIDE&CFID=16613560&CFTOKEN=64905172>>, CHI 2005, Papers: Small Devices 1, Apr. 2-7, Portland, Oregon, USA, pp. 201-210.

Moscovich, et al., "Navigating Documents with the Virtual Scroll Ring", retrieved on Dec. 29, 2008 at <<http://delivery.acm.org/10.1145/1030000/1029642/p57-moscovich.pdf?key1=1029642&key2=0780260321&coll=GUIDE&dl=GUIDE&CFID=16088809&CFTOKEN=41557310>>, UIST 2004, Oct. 24-27, 2004, Santa Fe, New Mexico, USA, pp. 57-60.

RedZee Search, retrieved on Feb. 24, 2008 at <<http://redzee.com/>>, RedZee Search Inc., 5 pgs.

Schraefel, et al., "Curve Dial: Eyes-Free Parameter Entry for GUIs", retrieved on Dec. 29, 2008 at <<http://eprints.ecs.soton.ac.uk/10053/1/I-07-schraefel.pdf>>, CHI 2005, Apr. 2-7, 2004, Portland, Oregon, USA, 2 pages.

Smith, et al., "Generalized and Stationary Scrolling", retrieved on Dec. 29, 2008 at http://delivery.acm.org/10.1145/330000/322577/p1-smith.pdf?key1=322577&key2=0490260321&coll=GUIDE&dl=GUIDE&CFID=16613757&CFTOKEN=41889447>>, UIST 1999, Asheville, NC., CHI Letter vol. 1, 1, pp. 1-9.

Wang, et al., "Designing a Generalized 3D Carousel View", retrieved on Dec. 29, 2008 at <<http://delivery.acm.org/10.1145/1060000/1057081/p2017-wang.pdf?key1=1057081&key2=6990260321&coll=GUIDE&dl=GUIDE&CFID=16613868&CFTOKEN=53845534, CHI 2005, Late Breaking Results: Short Papers, Apr. 2-7, Portland, Oregon, USA, pp. 2017-2020.

Wei, et al., "Integrating Lite-Weight but Ubiquitous Data Mining into GUI Operating Systems", retrieved on Sep. 30, 2008 at http://www.jukm.org/jucs_11_11/integrating_lite_weight_but/jucs_11_11_1820_1834_wei.pdf>>, Journal of Universal Computer Science, vol. 11, No. 11, Nov. 28, 2005, pp. 1820-1834.

Office Action for U.S. Appl. No. 12/399,293, mailed on Nov. 25, 2011, Darren K. Edge, "Focal-Control User Interface", 27 pgs.

* cited by examiner

MULTI-PANEL USER INTERFACE

BACKGROUND

As computing power continues to grow, many of today's users demand more concurrent functionality from their computing devices and the ability to consume large volumes of information simultaneously. In the existing paradigm of a windowing user interface environment (such as that provided by Microsoft's Windows®-brand operating system), a user typically opens several independent pane interfaces concurrently on the screen. It is not uncommon, for example, for a user to run several programs (e.g., email program, browser, word processing program, spreadsheet program, document viewers, etc.) at the same time, or perhaps even multiple instances of multiple programs. The user opens each program into its own pane interface, and typically arranges the pane interfaces in layers atop each other. The user may then track which programs are open and switch among them by selecting the individual pane interfaces, or by choosing associated program icons in a control menu.

While this windowing user interface environment is effective and commonly understood, there may be situations where a user wishes to arrange content in a different manner on a screen.

SUMMARY

A user interface and techniques for presenting subject matter in a panel-based layout on a display screen are described. The user interface (UI) has one or more demarcation bars to define multiple panels on the screen. In one described implementation, for example, two bars aligned perpendicular to one another are employed to define four separate and distinct panels. Different subject matter (e.g., data, content, programs, browser, etc.) may be placed in the various panels. A bar navigation element facilitates navigation of the demarcation bar(s) among preset positions. With the bar navigation element, a user can intuitively resize the panels using just a single actuation (e.g., a single click of a mouse, or a screen tap). Further, in certain implementations, the panels may be resized automatically in response to a programmatic event (e.g., an event occurring in one of the programs in a panel). After resizing, the panels remain in their original orientation and relative positioning, and remain visible in the user interface so that the user can easily track their location. The multi-panel UI fosters an intuitive and viewer friendly environment for concurrent consumption of multiple programs and other items.

This summary is provided to introduce concepts relating to user interfaces. These techniques are further described below in the detailed description. This summary is not intended to identify essential features of the claimed subject matter, nor is it intended for use in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

This disclosure describes a user interface and techniques for presenting subject matter on a screen. Generally, the user interface allows different subject matter (e.g., data, content, programs, browsers, etc.) to be displayed concurrently on a screen in predefined and resizable areas, or panels. A user can navigate around the panels and intuitively resize them via a single actuation event, such as a single mouse click or a touch screen tap from a stylus or finger. The panels are separated by one or more demarcation bars. For instance, a single bar may be used to separate two panels, two bars may define four panels, three bars may define six panels, and so on. The bars are movable in response to a single actuation event (although, if desired, the UI may be configured to execute on multiple sequential actuation events). In one implementation, a bar navigation element is overlaid on the user interface to provide a visual cue that aids the user when repositioning the bars. In response to a single actuation of the bar navigation element, the bars are moved to new positions, thereby resizing the panels. After resizing, the panels remain in their original orientation and relative positioning. Additionally, all of the panels remain visible so that the user can easily track their location. The multi-panel user interface fosters an intuitive and viewer friendly environment for concurrent viewing of multiple programs and other items.

In another aspect, the panels may be resized automatically in response to certain conditions. For instance, a program running in one of the panels may experience a condition (e.g., receipt of email in a mail program). In response, the user interface resizes the panels automatically to enlarge the focus panel containing the program so that the user can more quickly attend to the condition.

The user interface further supports simple drag-n-drop functionality to move subject matter to and from the panels.

Figure 1:
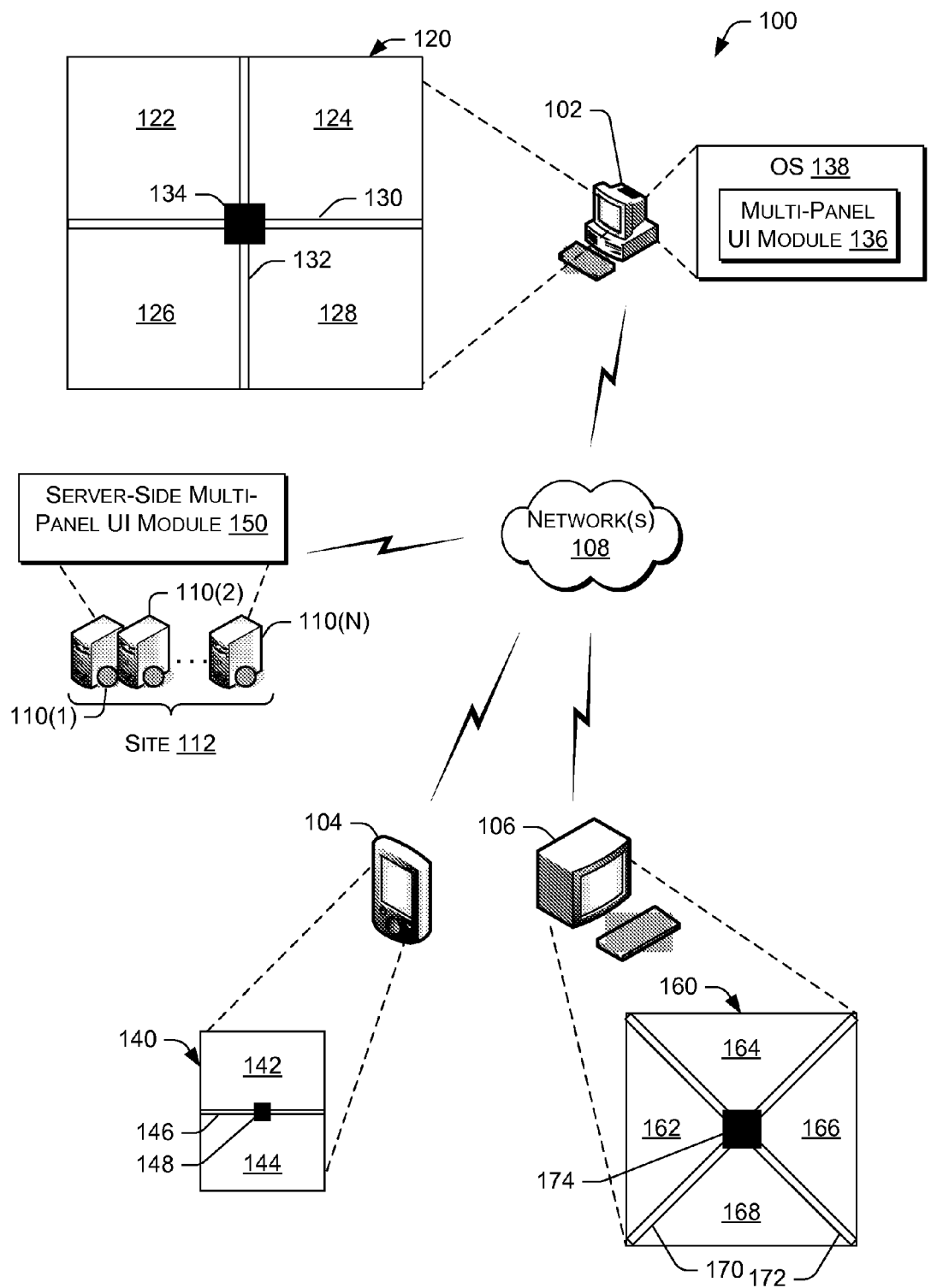
FIG. 1 illustrates an exemplary computing environment with multiple computing devices configured to present subject matter using various implementations of a panel-based user interface (UI).

While aspects of described techniques can be implemented in any number of different computing systems, environments, and/or configurations, embodiments are described in the context of the following exemplary computing environments.
Example Computing Environments FIG. 1 illustrates various computer environments 100 in which a multi-panel user interface (UI) and presentation techniques may be implemented. Environments 100 include exemplary computing devices that are configured to present content using a panel-based UI. In this illustrated example, the computing devices include a personal computer 102 (e.g., desktop, laptop, etc.), a portable handheld computing device 104 (e.g., PDA, smart phone, etc.), and a thin client or other terminal 106. All three computing devices 102-106 are capable of connecting to one or more networks, as represented by network 108, although certain computing devices (e.g., personal computer 102) may be operated as a standalone device without connection to a network.

The network 108 is representative of any one or combination of multiple different types of networks, interconnected with each other and functioning as a single large network (e.g., the Internet or an intranet). The network 108 may include wire-based networks (e.g., cable) and wireless networks (e.g., cellular, satellite, etc.). The network 108 may use any number of protocols and configurations to enable the computing devices 102-106 to access other devices and resources.

A representative set of servers 110(1), 110(2), ..., 110(N) is accessible via the network 108. The servers 110(1)-110(N) may be independent servers, or a collection of servers that are configured to perform larger scale functions (e.g., a server farm), or a set of servers configured to host one or more sites (e.g., websites) accessible by the network 108. In the illustrated example, the servers 110(1)-110(N) may represent private servers that serve content and programming to the thin client 106. Alternatively, the servers 110(1)-110(N) may represent a wireless services provider that provides content to wireless devices, such as portable handheld computing device 104. In still other implementations, the servers 110(1)-110(N) may be configured to host a site 112, such as a website accessible by anyone of the computing devices 102-106 via the Internet.

These various arrangements exhibit examples of environments where a multi-panel UI may be employed. Each computing device may present a multi-panel UI on a display screen. In a first example operating environment, the personal computer 102 presents a multi-panel UI 120 on a display, such as a CRT, flat LCD screen, or other display types. The multi-panel UI 120 consists of four panels: an upper left panel 122, an upper right panel 124, a lower left panel 126, and a lower right panel 128. Different subject matter may be placed in the four separate and distinct panels, thereby providing a viewer friendly layout of various items. The four panels 122-128 are separated by a horizontal demarcation bar 130 and a vertical demarcation bar 132 arranged perpendicularly to one another. A bar navigation element 134 is positioned at the intersection of the two demarcation bars 130 and 132. The multi-panel UI 120 is implemented as a module 136 as part of an operating system 138 that is stored and executed by the personal computer 102. A more detailed discussion of this example context is described below with reference to FIG. 2.

In a second example operating environment, the portable computing device 104 presents another multi-panel UI 140 on its touch sensitive screen. The multi-panel UI 140 has two panels-upper panel 142 and lower panel 144—separated by a single horizontal demarcation bar 146 (although the bar may be arranged in other directions, such as horizontally or diagonally). A bar navigation element 148 lies atop the bar 146. In this example, the multi-panel UI 140 may be implemented as a software module executing on the device 104, or alternatively, as functionality served as part of the content delivered by the servers 110(1)-110(N). Thus, as illustrated, a server-side multi-panel UI module 150 is executing at the servers 110(1)-110(N) to serve content to the portable computing device 104 with the UI functionality described herein.

In a third example operating environment, the thin client 106 presents another version of a multi-panel UI 160 that is depicted on a display, such as a CRT. Like the four-panel UI 120, the multi-panel UI 160 presents four panels separated by two demarcation bars. Here, however, the panels include a left panel 162, an upper panel 164, a right panel 166, and a lower panel 168 separated by diagonal, criss-crossing demarcation bars 170 and 172. A bar navigation element 174 resides at the intersection of the bars 170 and 172. In this thin client context, the UI 160 is supported by the server-side multi-panel UI module 150 at the servers 110(1)-110(N).

Multi-Panel UI Examples

Figure 2:
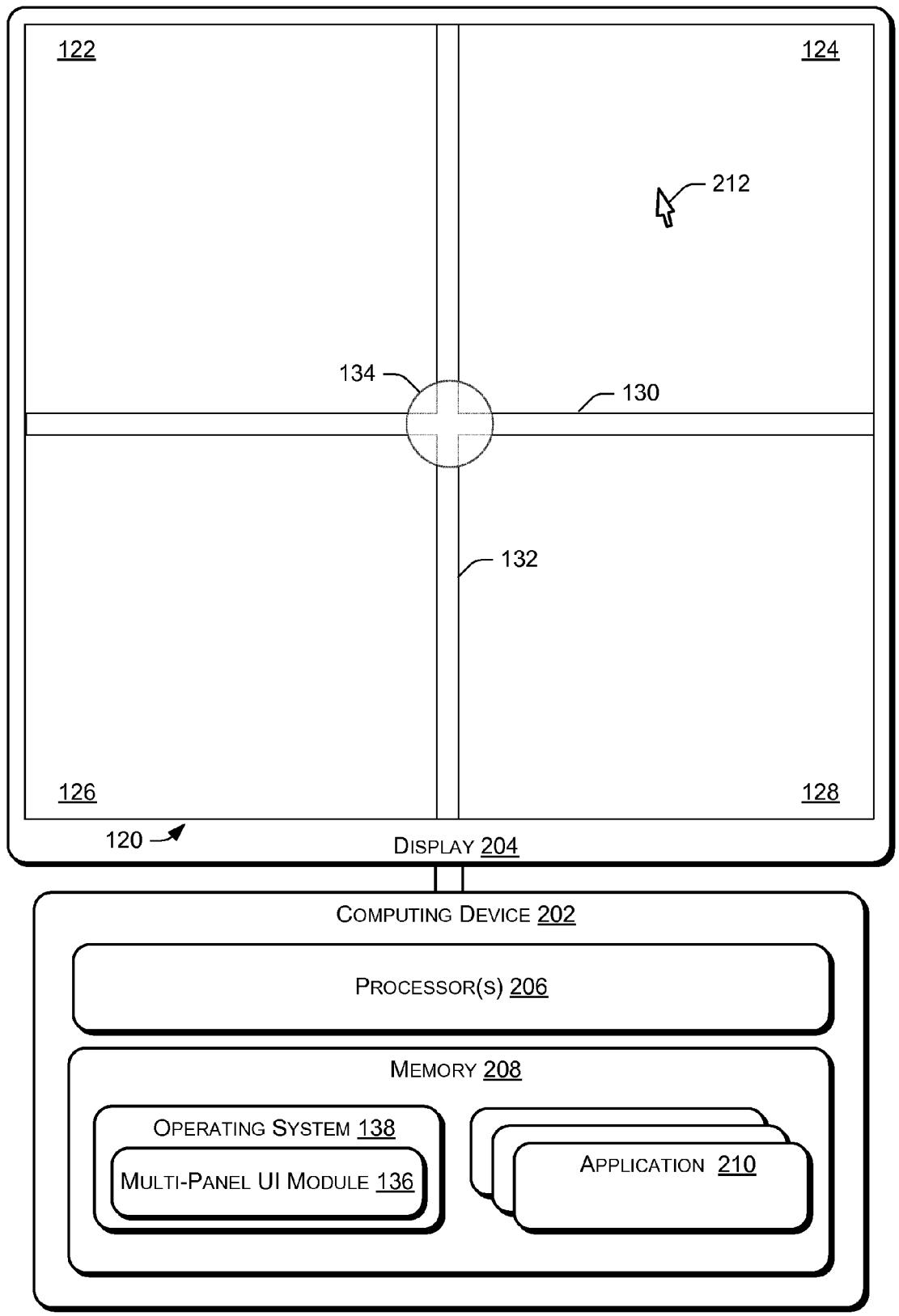
FIG. 2 is a block diagram of one of the computing devices in FIG. 1, and illustrates a four-panel UI in more detail.

FIG. 2 shows a more detailed system 200 in which the multi-panel UI is implemented. The system 200 is embodied as a computing device 202 that presents the multi-panel UI 120 on a display 204. The computing device 202 may be representative of any number of devices, including, for example, a personal computer, portable computer, communication device, entertainment device, and so forth. The computing device 202 has a processor 206 and a memory 208. The memory 208 includes computer-readable media in the form of volatile memory, such as Random Access Memory (RAM) and/or non-volatile memory, such as Read Only Memory (ROM) or flash RAM. In FIG. 2, the memory 208 stores an operating system 138 and one or more application programs 210 that are accessible by and executable on the processor 202. The memory 208 may further store various forms of content.

The multi-panel UI module 136 is shown as part of the OS 138 in the FIG. 2 implementation. When executed by the processor 206, the UI module 136 presents the multi-panel UI 120 on the display 204. In this example, the UI 120 covers all available screen area of the display 204, although in other embodiments, it may be configured to cover less than the entire screen area. The multi-panel UI 120 has four panels: an upper left panel 122, an upper right panel 124, a lower left panel 126, and a lower right panel 128. The four panels 122-128 define separate and distinct workspaces on the screen. Different content or programs may be placed in the panels.

Figure 3:
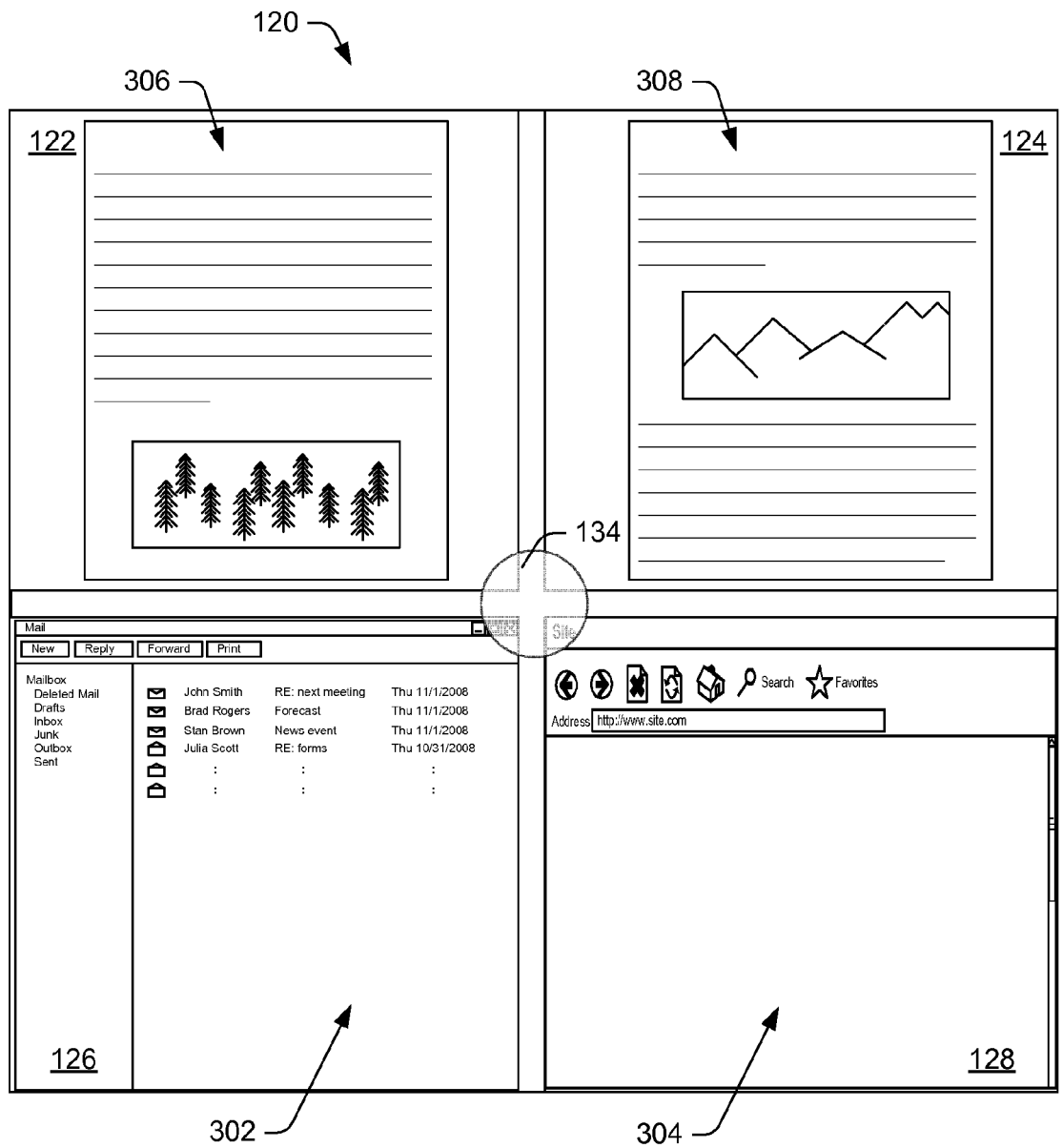
FIG. 3 illustrates the four-panel UI of FIG. 2, but further shows different subject matter placed in the four panels.

FIG. 3 shows an example where different subject matter is placed in the four panels of the UI 120. Here, an email program 302 is placed in the lower left panel 126. A browser 304 is put in the lower right panel 128. Two documents 306 and 308 are placed in the upper left panel 122 and upper right panel 124, respectively. The various forms of subject matter are presented in a viewer friendly layout, with non-overlapping panels that allow the user to see all the subject matter concurrently or focus on particular panels more specifically. The user can drag-n-drop subject matter to and from the panel. In this way, the user can easily move subject matter around without having to open and track numerous independent pane interfaces. It is noted that while two programs and two documents are shown in this example, any number of combinations of any type of subject matter may be used.

With reference again to FIG. 2, a first, horizontal demarcation bar 130 and a second, vertical demarcation bar 132 separate the four panels 122-128. The demarcation bars 130 and 132 are perpendicular to one another, intersecting at right angles. The demarcation bars are movable across the screen. In the illustrated arrangement, the horizontal bar 130 is movable in a first direction up and down the screen. The vertical bar 132 is movable in a second direction back and forth across the screen, which is perpendicular to the first direction. In operation, the demarcation bars can be slid concurrently or individually to any number of preset positions on the screen.

In one example described below with reference to FIGS. 4(a)-4(i), the bars are moved together among nine preset positions.

The UI 120 further includes a bar navigation element 134 that facilitates or initiates movement of the bars. The bar navigation element 134 provides visual cues to aid the user in navigating the bars among various preset positions. In the illustrated arrangement, the bar navigation element 134 is independent of the demarcation bars 130 and 132, but overlaid at the intersection of the two demarcation bars 130 and 132. Further, the bar navigation element 134 may be slightly transparent to expose the intersection of the two bars.

When a pointer 212 is moved atop different zones of the bar navigation element 134, a corresponding visual cue appears to inform the user of a corresponding navigation operation. If the user actuates the element 134 (e.g., single mouse click, stylus or finger tap, etc.), the bars are concurrently moved to one of the preset positions that corresponds to the visual cue. In this manner, the user can move the bars among the preset positions in response to a single actuation of the bar navigation element 134. Accordingly, the multi-panel UI 120 provides an intuitive navigation control that is easy to use with minimal control tasks.

FIGS. 4(a)-4(i) show an example set of navigation commands for navigating the two demarcation bars 130 and 132 to nine preset positions corresponding to nine visual cues provided by the bar navigation element 134. In the FIGS. 4(a)-4(i), a visual cue 402 is shown in different zones of the bar navigation element 134. The visual cue 402 appears, for example, when the user moves a pointer over a particular zone of the element 134. As shown, the visual cue 402 is a graphic with an arrow or pointer within a circle or bubble shaped element, although other representations may be used. The position of the visual cue 402 and direction of its interior arrow are intended to convey how the demarcation bars will be moved upon actuation of the navigation element 134. Moreover, single actuation of the element 134 when the visual cue 402 is visible causes the bars to reposition to a preset position indicated by the visual cue.

Figure 4A:
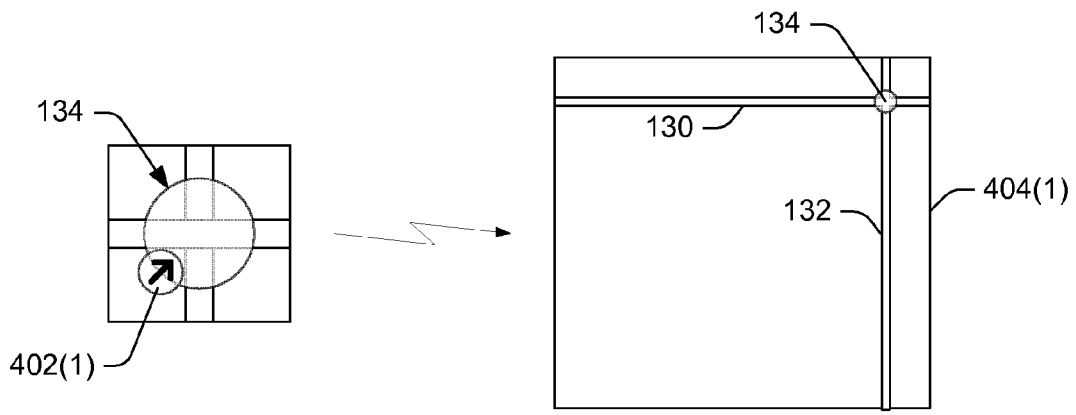
FIGS. 4(*a*)-4(*i*) illustrate a set of navigation commands for the four-panel UI of FIG. 2. These figures demonstrate how the bars are moved to resize the four panels in response to the commands.

In FIG. 4(a), a first position of the visual cue, referenced as 402(1), is shown in a lower left portion (or southwest zone) of the bar navigation element 134. Upon single actuation of the element 134 when this visual cue is visible, the horizontal demarcation bar 130 is moved to an upper position and the vertical demarcation bar 132 is moved to a rightmost position, as shown in a representation 404(1) of the multi-panel UI. Movement of the bars may take place instantaneously, or via a slower animated sliding, depending upon implementation decisions. By moving the bars together, all four panels are simultaneously resized. The lower left panel is enlarged while the remaining three panels are reduced in size. Notice, however, that all four panels retain their original orientation and relative positioning. Further, all four panels remain visible so that the user can easily track their location. The bar navigation element 134 is also moved to overlay the intersection of the two bars 130 and 132 in the upper right hand corner of the UI.

Figure 4B:
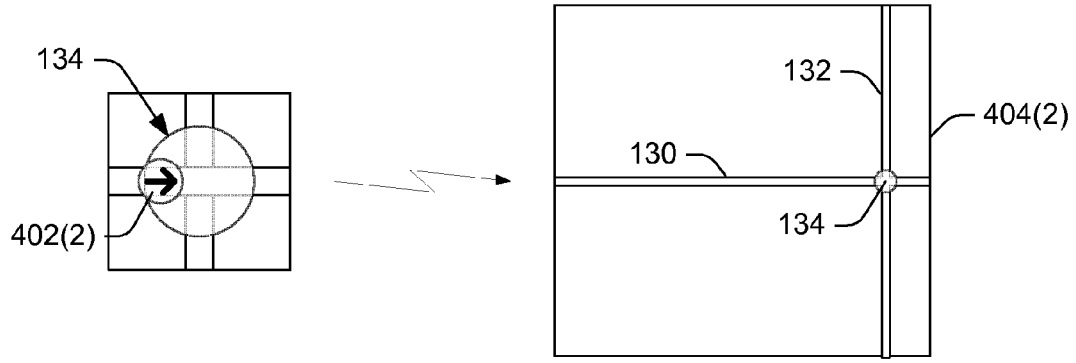

In FIG. 4(b), a second position of the visual cue, referenced as 402(2), is shown in a left portion (or west zone) of the bar navigation element 134. Upon single actuation of the element 134 when the western visual cue 402(2) is visible, the demarcation bars 130 and 132 are moved to the middle and rightmost positions, respectively, as shown in a representation 404(2) of the multi-panel UI. Here, the two left-side panels are enlarged (and both are approximately equal in size) while the two right-side panels shrink in size (and both are approximately equal in size). Also, once again, all four panels retain their original orientation and relative positioning, and remain visible. The bar navigation element 134 is placed over the intersection of the two bars 130 and 132 along the right hand side of the UI.

Figure 4C:
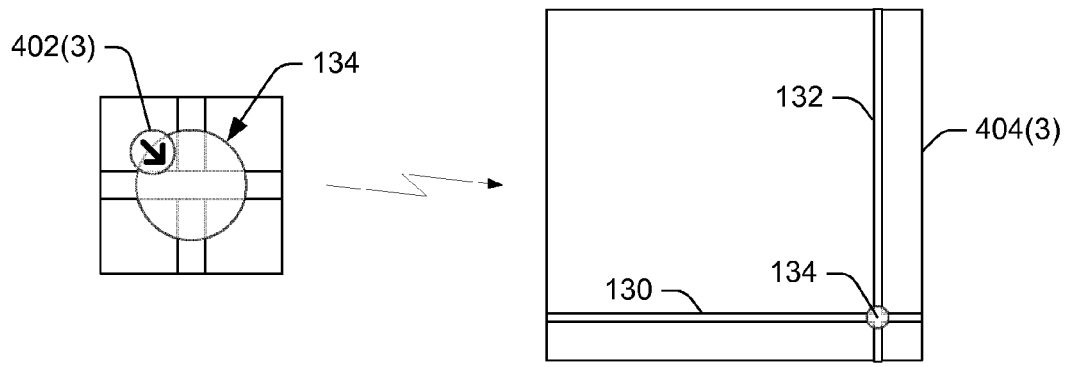

In FIG. 4(c), a third position of the visual cue, referenced as 402(3), is shown in an upper left portion (or northwest zone) of the bar navigation element 134. Upon single actuation of the element 134 when the northwestern visual cue 402(3) is visible, the demarcation bars 130 and 132 are moved to the lower and rightmost positions, respectively, as shown in a representation 404(3) of the multi-panel UI. The bar navigation element 134 is repositioned over the intersection of the two bars 130 and 132 in the lower right hand corner of the UI.

Figure 4D:
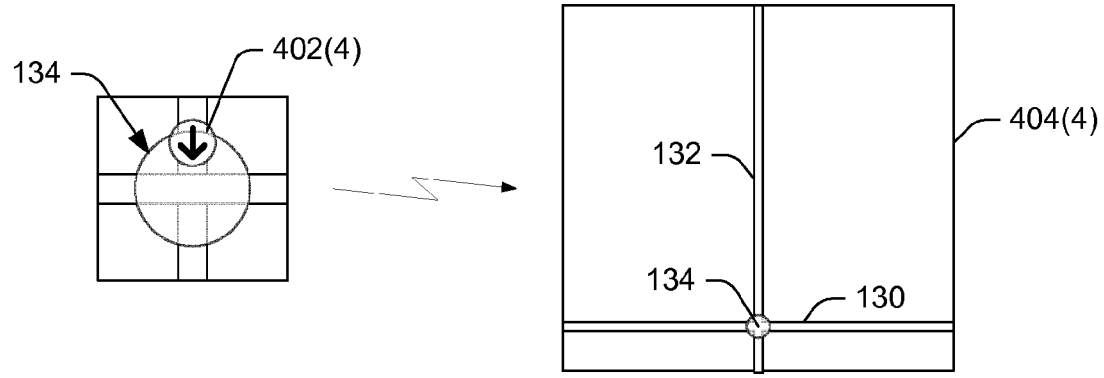

In FIG. 4(d), a fourth position of the visual cue, referenced as 402(4), is shown in the upper portion (or north zone) of the bar navigation element 134. Upon single actuation of the element 134 when the northern visual cue 402(4) is visible, the demarcation bars 130 and 132 are moved to the lower and middle positions, respectively, as shown in a representation 404(4) of the multi-panel UI. The bar navigation element 134 is repositioned over the intersection of the two bars 130 and 132 at the bottom of the UI.

Figure 4E:
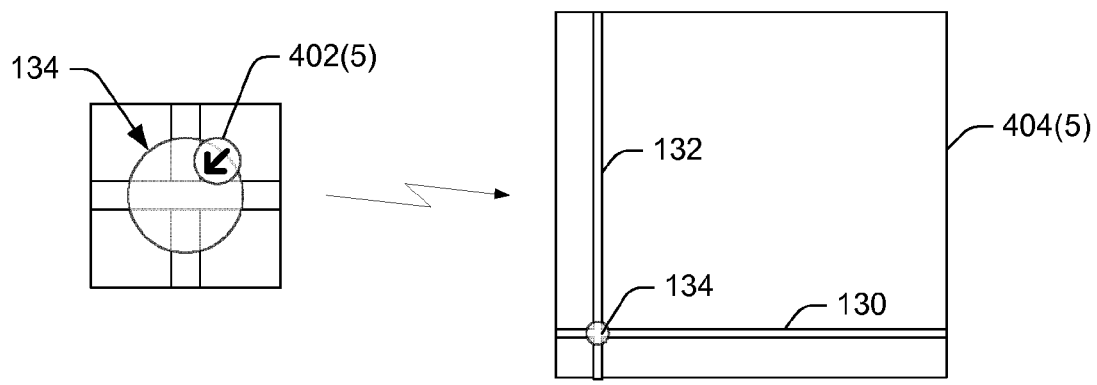

In FIG. 4(e), a fifth position of the visual cue, referenced as 402(5), is shown in the upper right portion (or northeast zone) of the bar navigation element 134. Upon single actuation of the element 134 when the northeastern visual cue 402(5) is visible, the demarcation bars 130 and 132 are moved to the lower and leftmost positions, respectively, as shown in a representation 404(5) of the multi-panel UI. The bar navigation element 134 is repositioned over the intersection of the two bars 130 and 132 at the lower left hand corner of the UI.

Figure 4F:
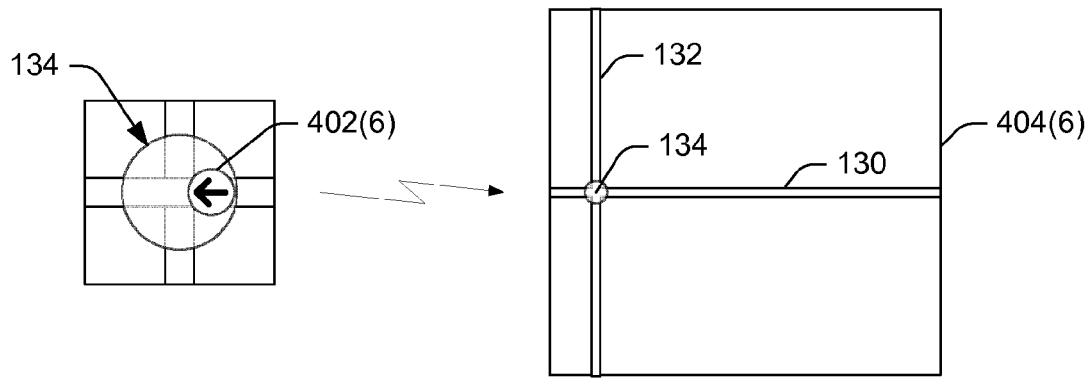

In FIG. 4(f), a sixth position of the visual cue, referenced as 402(6), is shown in a right portion (or east zone) of the bar navigation element 134. Upon single actuation of the element 134 when the eastern visual cue 402(6) is visible, the demarcation bars 130 and 132 are moved to the middle and leftmost positions, respectively, as shown in a representation 404(6) of the multi-panel UI. The bar navigation element 134 is repositioned over the intersection of the two bars 130 and 132 along the left side of the UI.

Figure 4G:
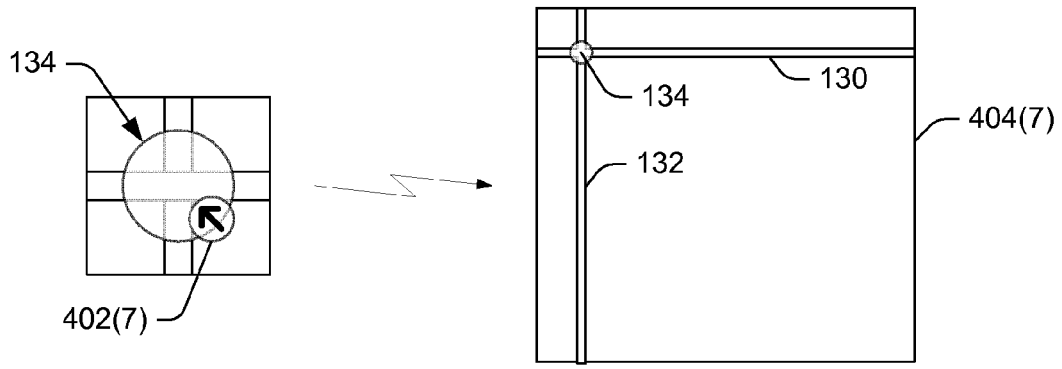

In FIG. 4(g), a seventh position of the visual cue, referenced as 402(7), is shown in the lower right portion (or southeast zone) of the bar navigation element 134. Upon single actuation of the element 134 when the southeastern visual cue 402(7) is visible, the demarcation bars 130 and 132 are moved to the upper and leftmost positions, respectively, as shown in a representation 404(7) of the multi-panel UI. The bar navigation element 134 is repositioned over the intersection of the two bars 130 and 132 at the upper left hand corner of the UI.

Figure 4H:
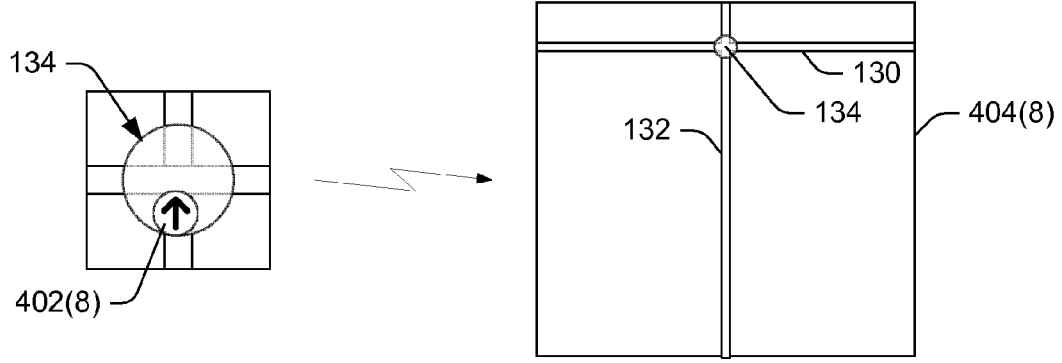

In FIG. 4(h), an eighth position of the visual cue, referenced as 402(8), is shown in the lower portion (or south zone) of the bar navigation element 134. Upon single actuation of the element 134 when the southern visual cue 402(8) is visible, the demarcation bars 130 and 132 are moved to the upper and middle positions, respectively, as shown in a smaller representation 404(8) of the multi-panel UI. The bar navigation element 134 is repositioned over the intersection of the two bars 130 and 132 at the top of the UI.

Figure 4I:
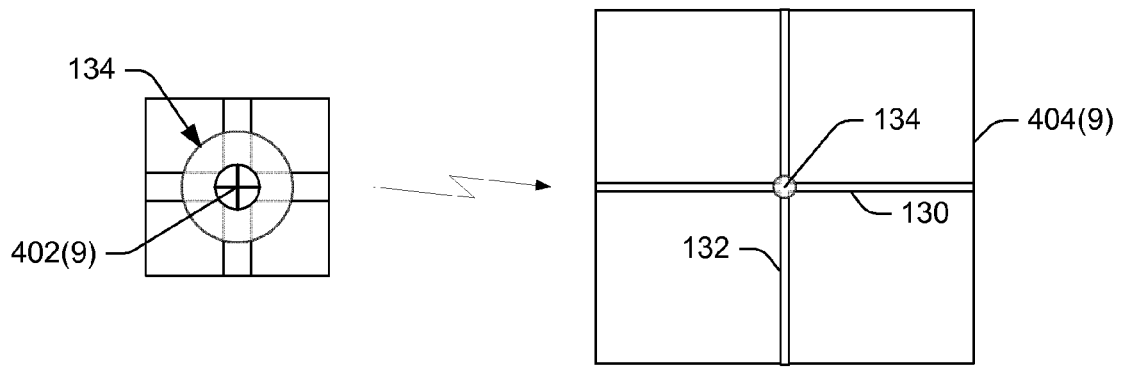

Finally, in FIG. 4(i), a ninth position of the visual cue, referenced as 402(9), is shown in the middle of the bar navigation element 134. Upon single actuation of the element 134 when the central visual cue 402(9) is visible, the demarcation bars 130 and 132 are moved to home positions in the middle of the screen as shown in a representation 404(9) of the multi-panel UI. The bar navigation element 134 is repositioned over the intersection of the two bars 130 and 132 at the center of the UI.

It is noted that the nine positions described in FIGS. 4(a)-4(i) are merely one example. The multi-panel UI may be configured support other preset positions of the demarcation bars. For instance, the home position shown in FIG. 4(i) may be configured to other arrangements that do not evenly split the screen into four equal-sized quadrants. In another implementation of a four-panel UI, such as UI 160 in FIG. 1, the positioning of the bars is different than that just described. Further, there may be more or less than nine preset positions for a four-panel UI. As one example, the four-panel UI 120 may be configured to support five preset positions, such as those shown in FIGS. 4(a), 4(c), 4(e), 4(g), and 4(i).

The multi-panel UI significantly reduces the operational overhead for users. Using a single actuation (e.g., single mouse click), a user can resize any of the panels. Unlike windowing environments where a user performs multiple actuations to identify, move, and arrange individual pane interfaces on a screen, the multi-panel UI effectively enlarges certain workspace on the screen of current focus for the user, while simultaneously minimizing other workspace on the screen without losing track or visibility of that other workspace. The four panel implementation is managed through a single actuation of a navigation element.

Figure 5:
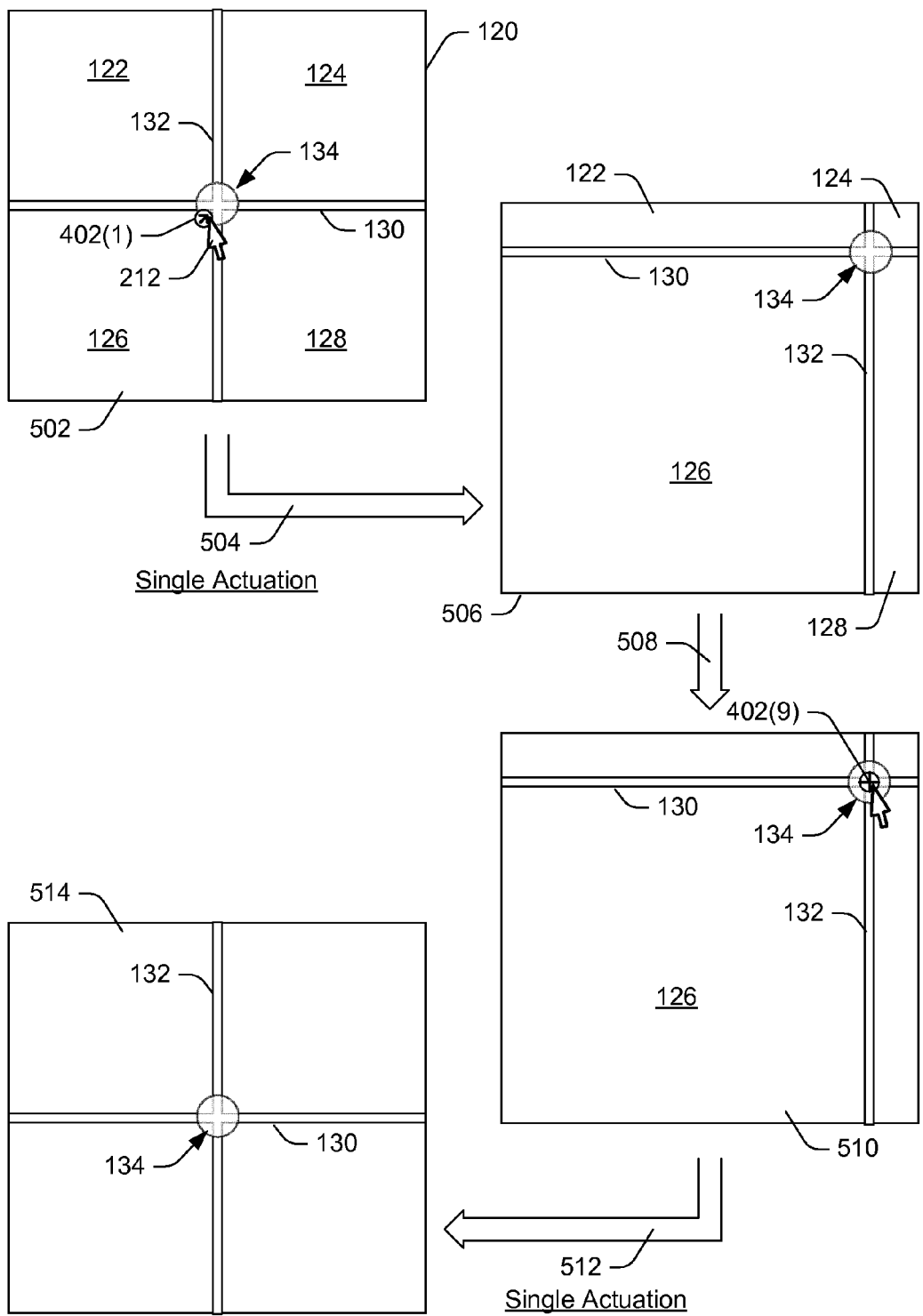
FIG. 5 shows a navigation sequence for the four-panel UI, wherein the panels are resized in response to single actuation events.

FIG. 5 shows an example of the ease and simplicity of navigating through the multi-panel UI 120. In a first screen display 502, the demarcation bars 130 and 132 reside in the home position. Suppose the user wants to change the layout to emphasize the lower left panel 126. To do this, the user hovers a pointer 212 over the lower left portion (southwestern zone) of the bar navigation element 134, and in response, the visual cue 402(1) appears. A single actuation of the visual cue 402(1), as represented by flow arrow 504, causes the horizontal demarcation bar 130 to move to the upper position and the vertical demarcation bar 132 to move to the right position, as shown in a second screen display 506. The lower left panel 126 is now enlarged to consume a greater portion of the screen area. The remaining three panels 122, 124, and 128 are minimized.

Now, suppose the user wants to return the layout to its original, home state. As represented by flow arrow 508, the user hovers the pointer 212 over the center portion of the bar navigation element 134. In response, the visual cue 402(9) appears at the center of the element 134 to inform the user of the navigation action to return the bars 130 and 132 to their home positions. This is shown in the third screen display 510. A single actuation of the visual cue 402(9) (e.g., a mouse click or stylus tap), as represented by flow arrow 512, causes the horizontal demarcation bar 130 and the vertical demarcation bar 132 to return to their middle positions, as shown in a fourth screen display 514. The four panels 122, 124, 126, and 128 are once again equal in size.

According to this implementation, the user can resize four screen areas with a single actuation. It is noted that, in other implementations, the commands may be something other than a single actuation. For example, multiple sequential actuations (e.g., a double click or double tap) may be used as the command movement of the bars in the multi-panel UI. Further, time may be used as a parameter. For instance, hovering the pointer 212 over the visual cue for a predefined period (e.g., 2 seconds) would automatically initiate the navigation action.

Figure 6A:
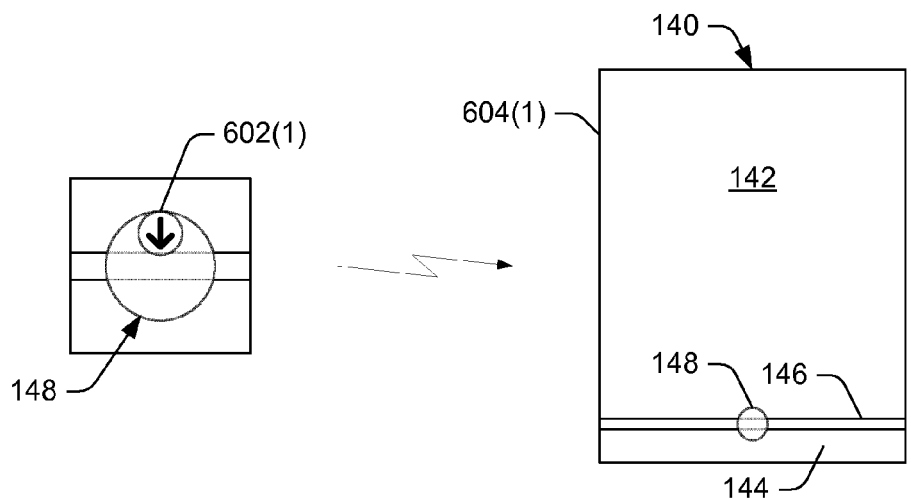
FIGS. 6(*a*)-6(*c*) illustrate a set of navigation commands for a version of the multi-panel UI having two panels and one bar, and how the commands cause movement of the bar to resize the two panels.
Figure 6B:
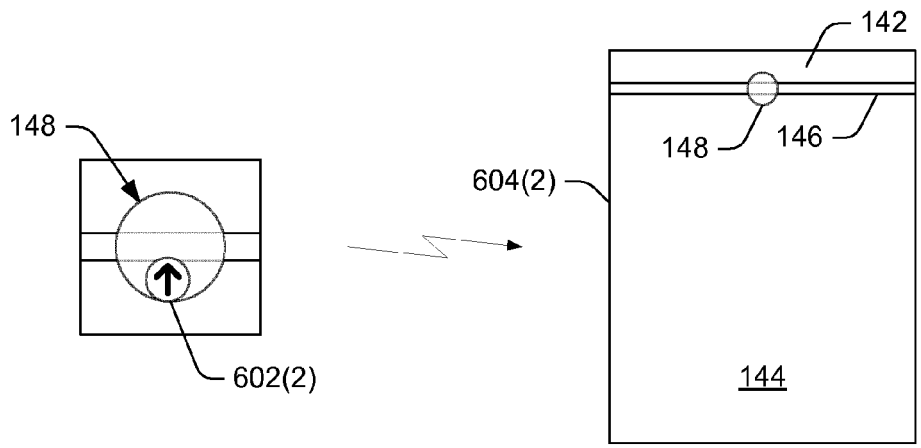
Figure 6C:
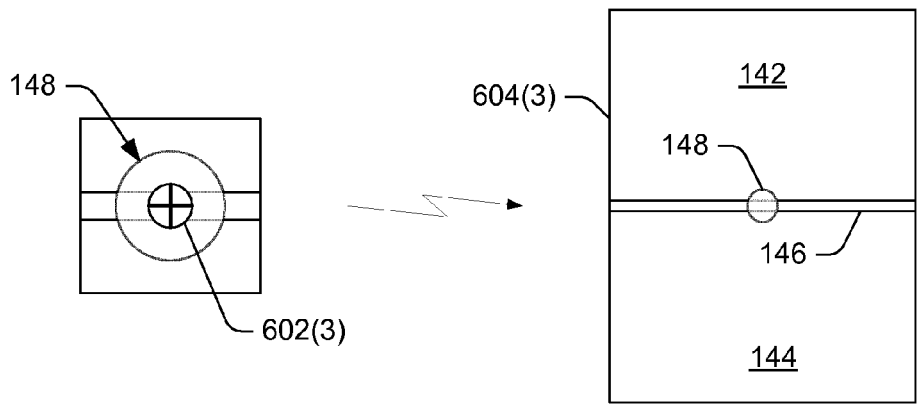

FIGS. 6(a)-6(c) show another example implementation for navigating a multi-panel UI, which in this case is the two-panel UI 140 (FIG. 1). The UI 140 has a single demarcation bar 146 to define an upper panel 142 and a lower panel 144. The bar navigation element 148 is positioned above the bar 146. In the FIGS. 6(a)-6(c), a visual cue 602 is shown in different portions of the bar navigation element 148. The visual cue 602 appears, for example, when the user moves a pointer over that region of the element 148. The visual cue 602 is similar to that of cue 402, having an arrow or pointer within a circle or bubble shaped graphical element, although other representations may be used. The position of the visual cue 602 and direction of its interior arrow are intended to convey how the corresponding demarcation bar 146 will be moved upon actuation of the navigation element 148.

In FIG. 6(a), a first position of the visual cue, referenced as 602(1), is shown in an upper portion (or north zone) of the bar navigation element 148. Upon single actuation of the element 148 when the north visual cue 602(1) is visible, the demarcation bar 146 is moved to the bottom position, as shown in a representation 604(1) of the multi-panel UI 140. The movement of the bar may be immediate, or an animated sliding, depending upon implementation decisions. In this position, the upper panel 142 is enlarged while the lower panel 144 is simultaneously reduced in size. However, the orientation and relative positioning of the two panels remain intact, and both panels remain visible. The bar navigation element 146 is repositioned to overlay the bar 146.

In FIG. 6(b), a second position of the visual cue, referenced as 602(2), is shown in a lower portion (or south zone) of the bar navigation element 148. Upon single actuation of the element 148 when the south visual cue 602(2) is visible, the demarcation bar 146 is moved to the top position, as shown in a representation 604(2) of the multi-panel UI 140. In this case, the lower panel 144 is enlarged while the upper panel 142 is simultaneously reduced in size. The bar navigation element 146 is repositioned atop the bar 146.

In FIG. 6(c), a third position of the visual cue, referenced as 602(3), is shown in a middle or central zone of the bar navigation element 148. Upon single actuation of the element 148 when the central visual cue 602(3) is visible, the demarcation bar 146 is moved to the middle position, as shown in a representation 604(3) of the multi-panel UI 140. The middle bar position may also be considered the home position for the two-panel UI 140, where the panels are approximately equal in size. The bar navigation element 146 is repositioned atop the centrally-located bar 146.

Figure 7:
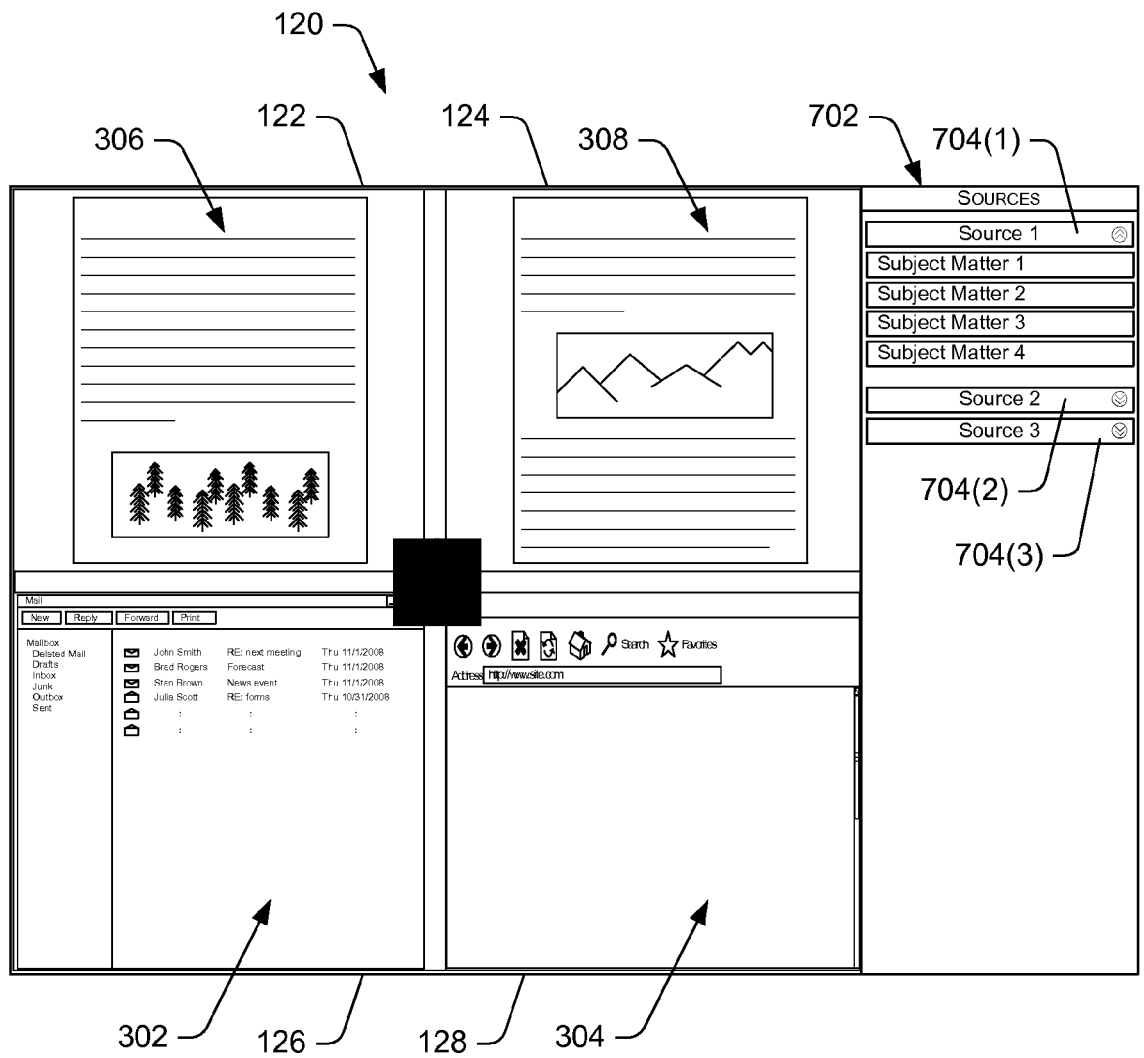
FIG. 7 illustrates the multi-panel UI adjacent to a source region that contains various types of subject matter that the user may wish to move to and from the panels.

FIG. 7 shows another aspect of the multi-panel UI, where a user can easily move subject matter to and from the workspaces defined by the panels. In this example, the multi-panel UI 120 with four panels is illustrated. A source region 702 is presented adjacent to the multi-panel UI 120. The source region 702 includes multiple sources for various types of subject matter, such as content, data, programs, and so forth. The data source region 702 includes one or more source sets or data field groups. In this illustration, the source region 702 shows three different source groups 704(1), 704(2), and 704(3). When expanded, each source group offers various choices of subject matter that a user can select to fill the panels. For a first source 704(1), there are four choices of subject matter for the four panels: a first document 306 in the first panel 122, a second document 308 in the second panel 124, an email program 302 in the third panel 126, and a browser 304 in the fourth panel 128. It is noted, however, that more or less than four choices may be presented in each group. The other sources 704(2) and 704(3) may have a different collection of subject matter, or a different mix that might include certain of the subject matter in the first source 704(1). Subject matter may be added to the panels in many ways. In one technique, the user employs simple drag-n-drop controls to move subject matter to and from the panels.

Figure 8:
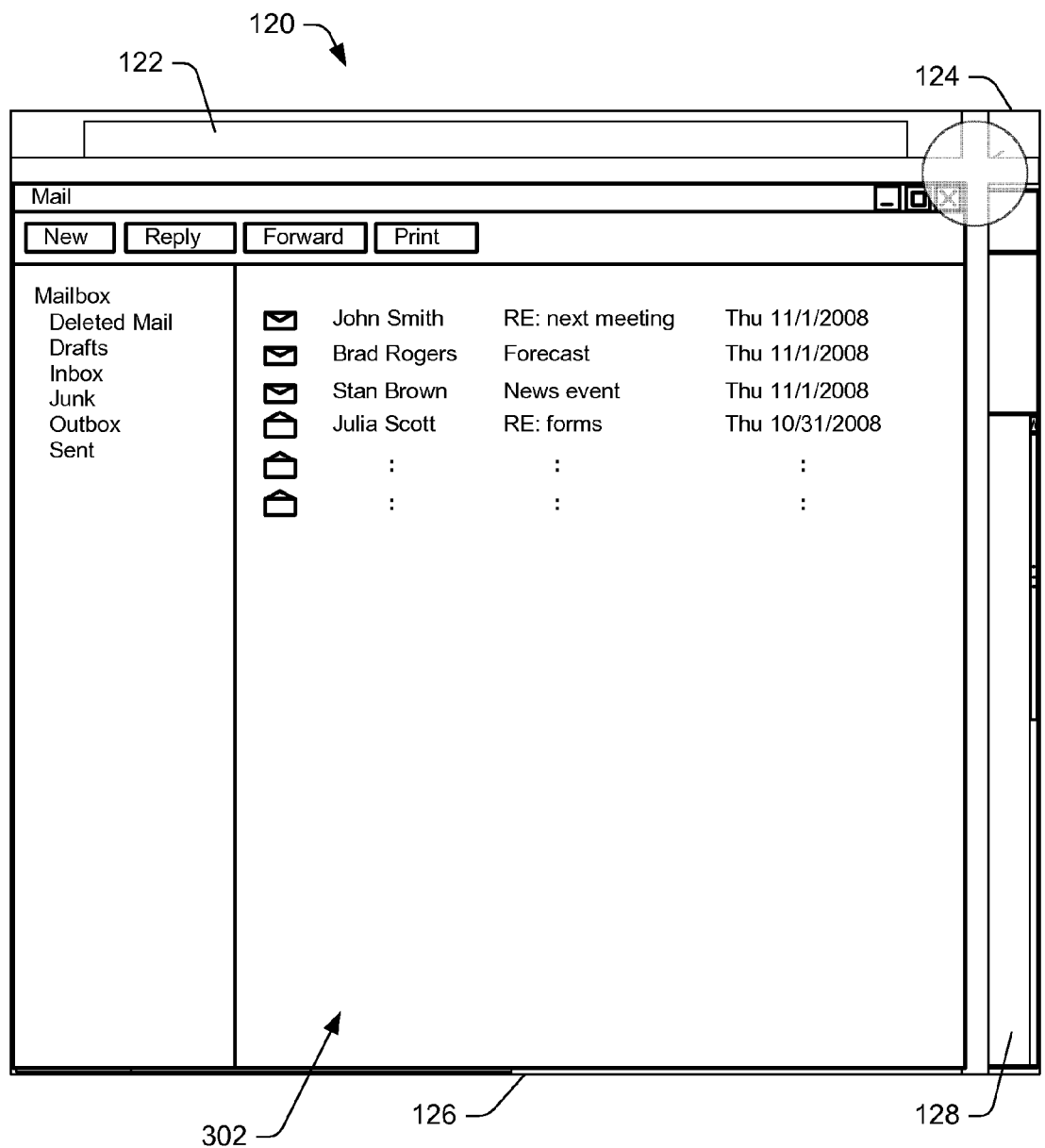
FIG. 8 illustrates the four-panel UI of FIG. 3, but following an event that automatically causes the panels to resize with the panel of focus being enlarged.

FIG. 8 shows another aspect of the multi-panel UI, in which the panels may be resized automatically in response to certain events (rather than navigation actions described above). As one example, suppose the user has placed the email program 302 in the lower left panel 126, as shown in FIG. 7. Now, suppose the user receives an email and wishes to reply. In response to an email-related event (e.g., receipt of the mail, opening the mail, the user initiating a "reply", etc.), the UI 120 may automatically resize the panels to enlarge the panel 126 holding the email program 302, as shown in FIG. 8. The remaining three panels 122, 124, and 128 are minimized, but retain the same relative position, orientation, and contents. The resizing may be immediate or an animated shifting of the bars, so that the user can readily understand how the panels are being resized.

Operation

Figure 9:
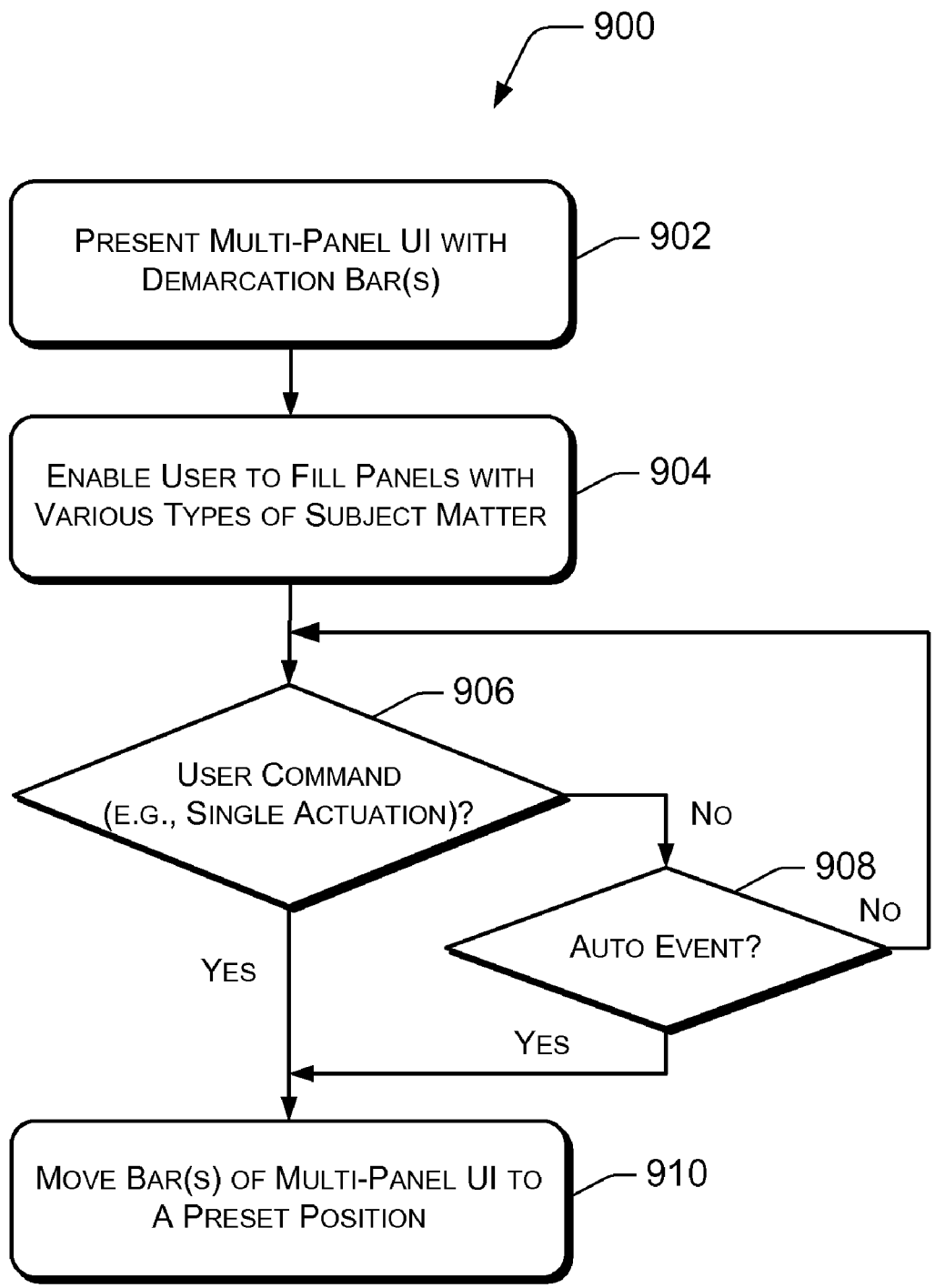
FIG. 9 is a flow diagram illustrating a process for presenting subject matter in a multi-panel UI on a screen.

FIG. 9 illustrates an example process 900 for presenting content in a multi-panel UI on a screen, and navigating within the UI. The process 900 is illustrated as a collection of blocks in a logical flow graph, which represents a sequence of operations that can be implemented in hardware, software, or a combination thereof. In the context of software, the blocks represent computer instructions that, when executed by one or more processors, perform the recited operations. For discussion purposes, the process 900 is described with reference to the various computing environments 100 shown in FIG. 1 and computer implementation shown in FIG. 2.

Note that the order in which the process is described is not intended to be construed as a limitation, and any number of the described process blocks can be combined in any order to implement the process, or an alternate process. Additionally, individual blocks may be deleted from the process without departing from the spirit and scope of the subject matter described herein.

At 902, a multi-panel user interface (UI) with one or more demarcation bars is presented. The demarcation bar(s) separate a screen area into separate and distinct content panels, which in turn can hold one or more types of subject matter, such as content, data, programs, and so forth. As one example, a four-panel UI 120 with two demarcation bars is shown in FIGS. 1-5 and 7-8. As another example, a two-panel UI 140 with one demarcation bar is shown in FIGS. 1 and 6.

As part of the presentation of the multi-panel UI at 902, an actuatable navigation element may be presented with the demarcation bars. The element may be located as part of the UI, or separate therefrom. In the examples described above, the navigation element is positioned atop a demarcation bar (e.g., element 148 on bar 146 in FIGS. 1 and 6), or an intersection of the bars (e.g., element 134 at the intersection of bars 130 and 132 in FIGS. 1-5 and 7-8). In certain implementations, the navigation element may be partially transparent in appearance.

At 904, a user is enabled to place various types of subject matter (e.g., content, data, programs, etc.) in the panels. In one implementation, various sources of subject matter may be presented alongside of the multi-panel UI and the user can move subject matter to and from the panels using drag-n-drop functionality (or other UI commands), as shown and described with reference to FIG. 7.

At 906 and 908, the process 900 facilitates movement of demarcation bar(s) in response to either a user command at 906 or an automatic event at 908. The user command may come in the form of a single actuation, such as a single mouse click or a single tap of a stylus or other pointing device. One example of this is explained above with reference to FIG. 5. Alternatively, other forms of user navigation commands may be implemented, such as a double click or hovering a pointer over the actuatable navigational element for a predetermined period of time. If no user command is entered, the process 900 also checks for any events that may automatically cause the bar(s) to move (908). One example of such an event is a program event, where the UI is responsive to certain events that occur in a program in one of the panels. For instance, suppose an email program is open in one of the panels. Occurrence of an email event (e.g., new mail received, opening a new mail, replying or forwarding a new mail, etc.) may cause bars to move to another preset position automatically to enlarge the panel with the email program. This example is described above with reference to FIG. 8.

At 910, in response to either a user command or an event, the demarcation bars are moved to a preset position. There may be any number of preset positions. Movement of the demarcation bars effectively resizes the panels relative to one another, but maintains the panels in their same relative position and orientation. In one implementation, the UI has two demarcation bars to define four panels. The bars may be placed in nine different preset positions, including one home position in which the content panels are approximately equal in size. An example of this home position is shown in FIGS. 2, 3, and 4(i). There are also four preset positions in which two of the content panels are enlarged in size relative to the home position and approximately equal in size to one another. The other two content panels are reduced in size relative to the home position and approximately equal in size to one another. Examples of these four preset positions are shown in FIGS. 4(b), 4(d), 4(f), and 4(h). The remaining four preset positions involve having one content panel that is enlarged in size relative to the home position and consuming most of the screen. Two of the content panels are reduced in size relative to the home position and approximately equal in size to one another, and the fourth content panel is smaller in size relative to the home position and relative to the reduced second and third content panels. Examples of these four preset positions are shown in FIGS. 4(a), 4(c), 4(e), and 4(g). It is noted that more or less than nine preset positions may be used for the four-panel UI. For instance, five preset positions may be defined, including the home position of FIG. 4(i) and the four preset positions with one enlarged panel as shown in FIGS. 4(a), 4(c), 4(e), and 4(g).

In another implementation, the UI has one demarcation bar used to define two panels. In this case, the bar may be placed in three preset positions, including a home position in which both panels are relative equal in size (see FIG. 6(c)) and two other preset positions where one panel is enlarged while the second panel is reduced in size (see FIGS. 6(a) and 6(b)).

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A user interface provided by a computing device executing instructions, the user interface comprising:
   multiple panels to define separate and distinct workspaces;
   a first bar perpendicular to and intersecting with a second bar to demarcate the multiple panels, the first bar and the second bar being movable to alter sizes of the multiple panels such that movement of the first bar or the second bar enlarges a first panel while simultaneously reducing a second panel; and
   a bar navigation element comprising a plurality of actuation zones facilitating movement of the one or more bars to resize the panels to one of at least three preset positions in response to a single actuation event generated by a user conducing a single interaction with a one of the plurality of actuation zones, wherein a relative size of resized panels corresponds to a one of the at least three preset positions that corresponds to the one of the plurality of actuation zones with which the user interacted.

2. The user interface of claim 1, wherein the workspaces defined by the panels hold different program interfaces.

3. The user interface of claim 1, further comprising drag-n-drop functionality to move subject matter to and from the workspaces defined by the panels.

4. The user interface of claim 1, further comprising moving the one or more bars to simultaneously resize the multiple panels while maintaining the orientation and relative positions of each of the multiple panels with respect to others of the multiple panels.

5. The user interface of claim 1, wherein:
the bar navigation element facilitates navigation among the at least three preset positions comprising a first position in which the first panel and the second panel are approximately equal size, a second position in which the first panel is enlarged and the second panel is reduced, and a third position in which the first panel is reduced and the second panel is enlarged, wherein in each of the three preset positions the orientation and relative position of the first panel and the second panel is retained and the first panel and the second panel both remain visible.

6. The user interface of claim 1, wherein:
the bar navigation element is overlaid at the intersection of the first and second bars.

7. The user interface of claim 6, wherein the bar navigation element facilitates navigation of the first and second bars among at least nine preset positions.

8. The user interface of claim 7, wherein the bar navigation element has nine actuation zones with associated visual cues that appear when a pointer is moved atop a one of the nine actuation zones and that indicate how the one or more bars will be moved upon actuation of the bar navigation element, the nine actuation zones corresponding to the nine preset positions such that a single actuation of one of the nine actuation zones causes the first and second bars to move to a one of the preset positions corresponding to the one of the nine actuation zones.

9. A method comprising:
presenting a user interface with a first demarcation bar perpendicular to, and intersecting with, a second demarcation bar to separate a screen area into four separate and distinct content panels, the first bar being movable in a first direction and the second bar being movable in a second direction perpendicular to the first direction, the content panels being configured to hold one or more types of subject matter;
presenting an actuatable element as part of the user interface, the actuatable element comprising a plurality of actuation zones within the actuatable element, each of the actuation zones corresponding to one of at least three preset positions of the first and second bars; and
facilitating movement of the demarcations bars among the at least three preset positions, the movement of the demarcation bars simultaneously resizing the panels relative to one another, wherein movement of the demarcation bars to a one of the at least three preset positions occurs in response to a single user actuation of a one of the plurality of actuation zones that corresponds to the one of the at least three preset positions.

10. The method of claim 9, wherein the at least three preset positions include a home position in which the content panels are approximately equal in size and the plurality of actuation zones includes a zone that, when actuated by the single user actuation, causes the demarcation bars and the content panels to move to the home position.

11. The method of claim 9, wherein the single user actuation comprises at least one of a mouse click or a screen tap.

12. The method of claim 9, further comprising:
enabling movement of the demarcation bars from a home position to one of the at least three preset positions responsive to a first single actuation event when a pointer is positioned over a one of the plurality of actuation zones of the actuatable element that corresponds to the one of the at least three preset positions and return of the demarcation bars to the home position responsive to a second single actuation event when a pointer is positioned over a different one of the plurality of actuation zones of the actuatable element that corresponds to home position.

13. The method of claim 9, further comprising presenting a data source region separate from the content panels, the data source region containing subject matter that may be moved to any one of the content panels.

14. The method of claim 9, wherein the facilitating movement further comprises enabling movement among at least nine preset positions including:
one home position in which the content panels are approximately equal in size, wherein a center of the actuatable element is an actuation zone that, when actuated, causes the content panels to move to the home position;
a first set of four preset positions in which two content panels are enlarged in size relative to the home position and approximately equal in size to one another, and two content panels are reduced in size relative to the home position and approximately equal in size to one another, wherein four actuation zones of the actuatable element are located in line with one of the demarcation bars and, when actuated, cause the content panels to move to a respective one of the first set of four preset positions; and
a second set of four preset positions in which one content panel is enlarged in size relative to the home position, two content panels are reduced in size relative to the home position and approximately equal in size to one another, and a remaining content panel is smaller in size relative to the home position and to the reduced second and third content panels, wherein four actuation zones of the actuatable element are located on a corner of a one of the content panels, the corner closer to the actuatable element than the other corners of the one of the content panels, and, when actuated, cause the content panels to move to a respective one of the second set of four preset positions.

15. The method of claim 14, wherein a one of the four actuation zones located in line with one of the demarcation bars, when actuated, causes the two content panels closest to the actuated one of the four actuation zones to enlarge and causes the other two content panels to shrink in size, and
wherein a one of the four actuation zones located on a corner of one of the content panels, when actuated, causes the one of the content panels to enlarge, causes the content panel positioned across the first demarcation bar and the content panel positioned across the second demarcation bar to shrink in size, and causes the content panel positioned across both the first and second demarcation bars to shrink to a smaller size than either of the content panel positioned across the first demarcation bar or the content panel positioned across the second demarcation bar.

16. A memory storing computer-executable instructions that, when executed, perform acts comprising:
- presenting first and second bars to define four distinct and separate workspaces, the first bar being movable in a first direction and the second bar being movable in a second direction perpendicular to the first direction, the first and second bars intersecting one another;
- presenting a bar navigation element to facilitate navigation of the first and second bars among at least five preset positions, the bar navigation element comprising at least five actuation zones and each of the actuation zones corresponds to a respective one of the preset positions; and
- enabling navigation from any one of the at least five preset positions to any other of the at least five preset positions in response to a single actuation of the bar navigation element by a user conducting a single interaction with a one of the actuation zones which causes the first and second bars to move to the respective one of the preset positions that corresponds to one of the actuation zones.

17. The memory of claim 16, wherein the bar navigation element is overlaid at the intersection of the first and second bars.

18. The memory of claim 16, wherein the first and second bars slide in an animated fashion when moving among the five preset positions.

19. The memory of claim 16, further comprising computer-executable instructions that, when executed, perform the additional acts of presenting a source region that holds various types of subject matter that may be placed in the workspaces, and facilitating placement of the subject matter in the workspaces using drag-n-drop functionality to and from the source region.

20. The memory of claim 16, wherein the single interaction comprises a mouse click, a stylus tap, or a finger tap.

* * * * *